United States Patent [19]

Baun

[11] Patent Number: 4,563,824
[45] Date of Patent: Jan. 14, 1986

[54] METHOD AND APPARATUS FOR DISC POSITION CENTERING

[75] Inventor: Kenneth W. Baun, El Toro, Calif.

[73] Assignee: Charlton Associates, Irvine, Calif.

[21] Appl. No.: 560,533

[22] Filed: Dec. 12, 1983

[51] Int. Cl.$^4$ .............................................. G01B 5/25
[52] U.S. Cl. .................................. 33/568; 33/180 R; 33/552
[58] Field of Search ............ 33/172 R, 172 D, 169 R, 33/169 C, 180 R, 181 R, 174 Q, 174 L, 174 TA, 185 R, 568, 569, 573, 552

[56] References Cited

U.S. PATENT DOCUMENTS 3,270,423  9/1966  Birrell et al. ...................... 33/174 L
4,426,786  1/1984  Conerly ............................. 33/180 R Primary Examiner—Harry N. Haroian
Attorney, Agent, or Firm—Spensley, Horn, Jubas & Lubitz

[57] ABSTRACT

A method and apparatus for disc position centering is disclosed. The invention is adapted to precisely position the center of a disc at a predetermined position, in relation to the disc's outer diameter, when the allowable variation of the absolute value of the outer diameter is larger than the degree of centering precision required. The apparatus is adapted to determine the outer diameter of the disc using a displacement measuring device, and data provided to the system computer. The apparatus then positions the disc to the desired center position using devices which grip the disc by its outer periphery and whose relationship to the desired center position is known.

18 Claims, 8 Drawing Figures

METHOD AND APPARATUS FOR DISC POSITION CENTERING

BACKGROUND OF THE INVENTION

1. Field of the Invention

This invention relates to techniques for determining and positioning the center of a disc precisely over a predetermined location based on the outer diameter of the disc and wherein the outer diameter varies from disc to disc.

2. Description of the Prior Art

When machining parts in high volume, a fixture is typically made which holds a given part in the proper position relative to the cutting tool. The fixture normally has fixed stops or rest elements that press against reference surfaces of the part. The positions of the fixed stops or rest elements determine the relative position of the intended machining operation and the part reference surfaces. For locating a diameter of a disc, a pair of pins is often adequate if the allowable tolerance of the center location is large compared to the variation of the diameter, since the center of the diameter shifts by approximately half the variation in the diameter.

For the case where the allowable tolerance of location of the diameter is not large compared to the diameter variations, simple fixed pins or stops are not adequate to center the disc. This is the case for hard disc memory storage devices, for example.

It is therefore one object of the present invention to provide a precise automatic disc position centering device.

Another object of the invention is to accomplish precise automatic position centering of discs whose absolute outer diameters vary to a degree greater than mechanisms of the prior art can adequately center.

A further object of the present invention is to provide a means of firmly holding each disc in the centered position for clamping and subsequent machining processes.

SUMMARY OF THE INVENTION

A method and apparatus is disclosed to precisely position the center of a disc over a predetermined position or axis, relative to its outer diameter, when the variation of the absolute value of the outer diameter is larger than the degree of centering precision required. The apparatus includes first, second and third disc positioning means disposed on a disc centering table equidistant from one another about a center axis, a displacement measuring device coupled to said first positioning means, and a system computer coupled to said positioning means and said displacement measuring means. The apparatus is operable in a calibration mode and in an operation mode. In the calibration mode, reference positions of the positioning means are determined in relation to a master disc tool of a known diameter, larger than the diameters of workpiece discs to be centered during the operation mode. During the operation mode, a workpiece disc is placed between the positioning means. The positioning means are moved to their respective reference positions. The displacement measuring device includes a spring-loaded core member extending toward the predetermined, which contacts the disc and urges it toward and into contact with the second and third positioning means. The displacement measuring device is adapted to generate a signal indicative of the distance between the reference position of the first positioning means and the periphery of the workpiece disc. This signal is then processed by the system computer to calculate the radius of the workpiece disc and to determine the appropriate distances to concentrically move the first, second and third positioning means from their reference position to positions contacting the disc so as to center the disc at the predetermined axis and grip it for subsequent machining processes which require the precise positioning of the disc center.

DETAILED DESCRIPTION OF THE PREFERRED EMBODIMENT

The present invention comprises a novel method and apparatus for disc position centering. The following description of the invention is provided to enable any person skilled in the art to make and use the invention. Various modifications to the preferred embodiment will be readily apparent to those skilled in the art, and the generic principles described herein may be applied to other embodiments. Thus, the present invention is not intended to be limited to the embodiment shown, but is to be accorded the widest scope consistent with its principles and novel features.

Figure 1:
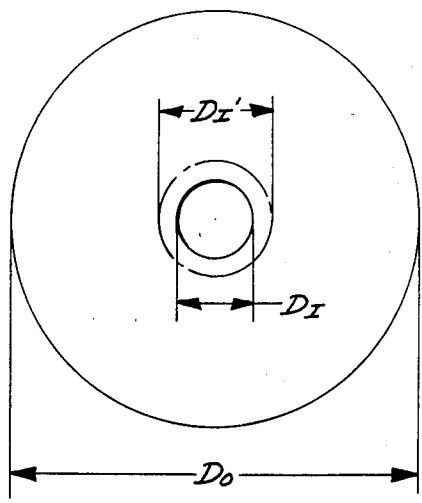
FIG. 1 is a top view illustration of a typical disc to be centered.

The preferred embodiment is adapted to precisely position metallic discs which are utilized for Winchester type hard disc memory storage devices. The discs are fabricated from aluminum disc stock, which is subsequently machined to very close tolerances. FIG. 1 illustrates a top plan view of a circular disc workpiece as is typically used to fabricate a memory disc unit. The outer diameter $D_o$ of the disc may typically have a nominal value of 5.118 inches, with an allowable tolerance of $\pm 0.003$ inches. The disc typically is required to include an inner opening, around which the disc will be rotated at high speed when mounted in the Winchester disc drive. For the reasons discussed in the related application of Richard J. Elliott, entitled "Rigid Memory Disc Substrate Manufacturing Method," filed concurrently herewith, Ser. No. 560,416 now U.S. Pat. No. 4,517,772 and assigned to the same assignee as the present application, Charlton Associates, Inc., the disc workpiece is formed from disc stock having an inner diameter $D_I$ which is smaller than the required inner diameter $D'_I$ of the inner opening of the finished disc, shown in FIG. 1 in phantom. The dimension of the inner diameter $D_I$ may typically have an allowable tolerance of only $\pm 0.001$ inches.

The present invention is adapted to precisely locate the center of the disc part with respect to a predetermined reference point, for example, the center axis of a machining tool. The disc may then be clamped in place and the inner opening enlarged to the required tolerance. This process is by way of example only, as other processing steps may also require the precise centering afforded by the present invention.

Figure 2:
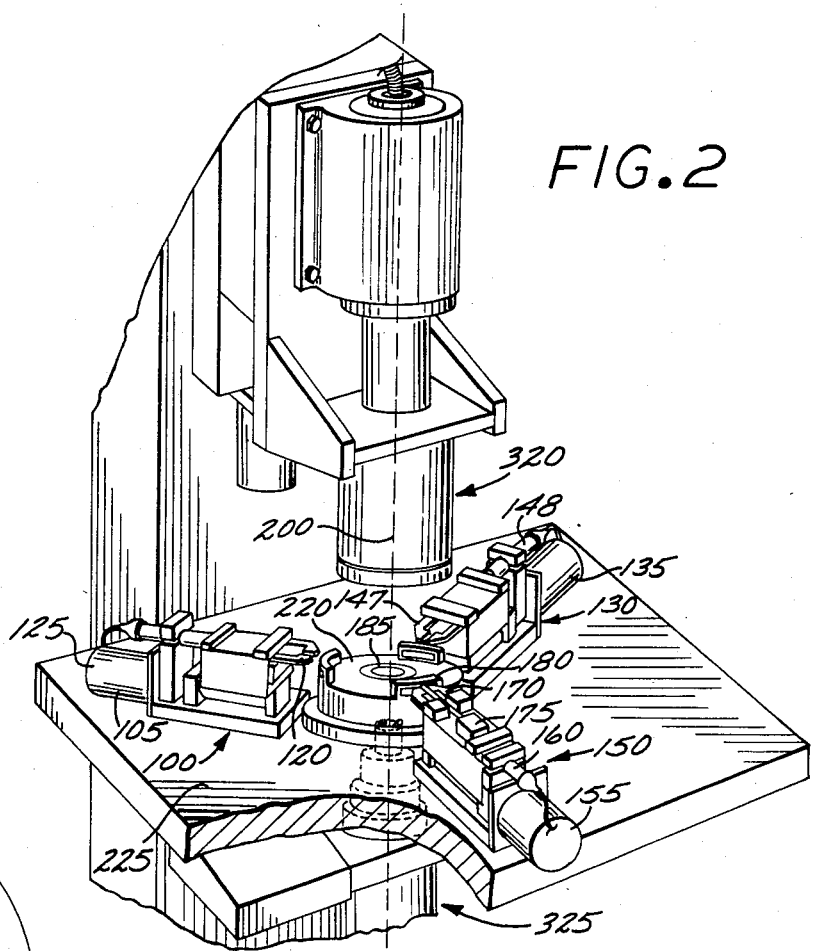
FIG. 2 is a perspective view illustrating the disc centering apparatus of the preferred embodiment.

Referring now to FIG. 2, a perspective of the disc handling apparatus of the preferred embodiment is illustrated. The apparatus includes a first flat planar surface 225 on which disc handling assemblies 100, 130 and 150 are disposed. The assemblies are spaced equidistant from each other about center axis 200. Disposed axially above and below the surface 225 are machine tools 320,325. The machine 320 includes a disc gripping surface. Discs are placed on planar surface 220 and centered with respect to axis 220 by disc handling assemblies 100,130,170. Tool 320 is then moved downwardly to clamp the workpiece disc in its centered location. Machine tool 325 comprises a cutting tool which is brought upwardly through opening 185 in surface 220 to perform a machining process on the workpiece disc, to cut a precisely centered inner opening in the disc. Deburring operations are carried out by machine tools 320,325 as well, and the metallic particles removed from the disc are carried away. Once the machining processes are completed, machine tool 320 and the cutting tool of machine tool 325 are moved away from the workpiece disc to allow its removal.

Figure 3:
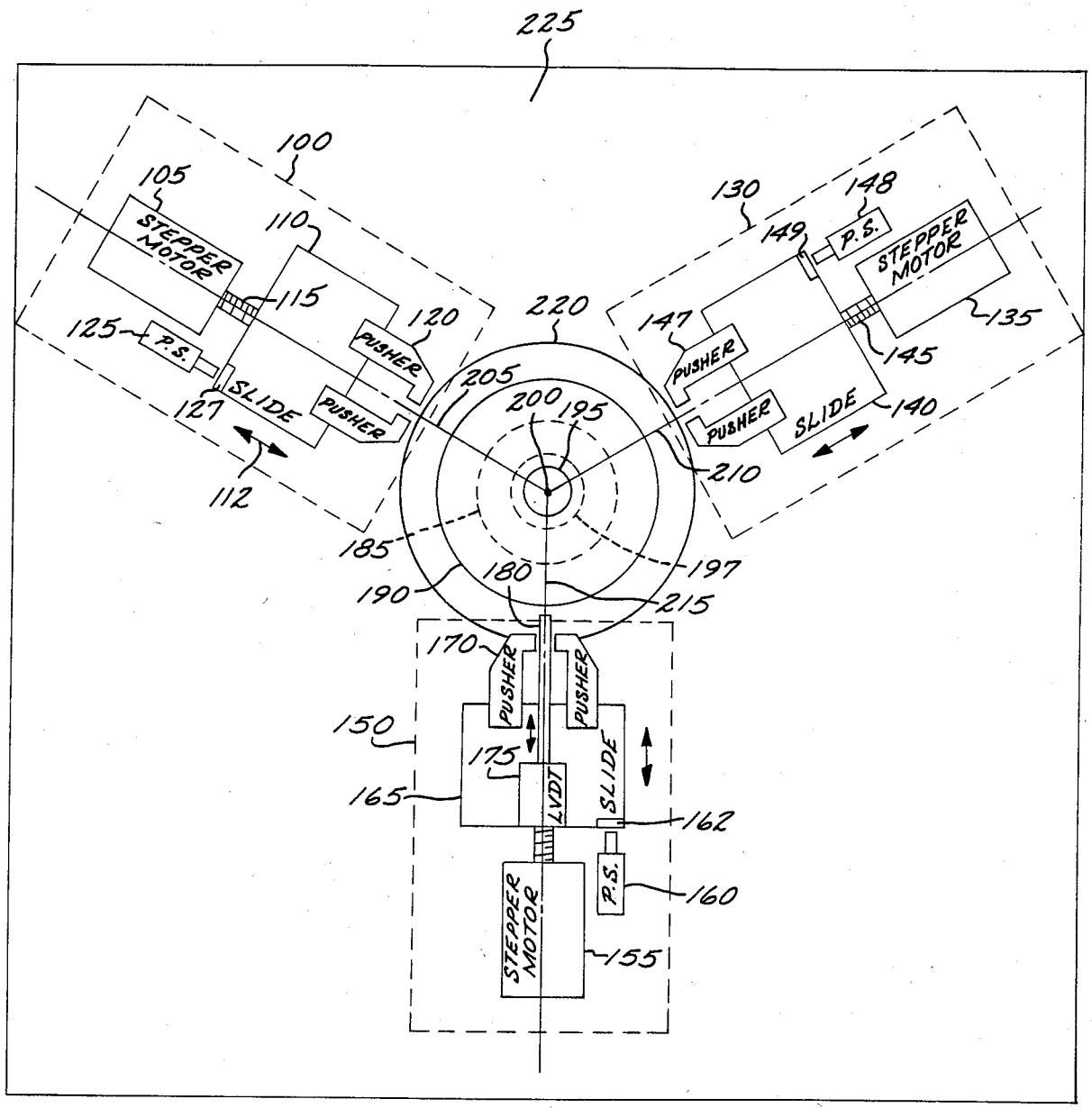
FIG. 3 is a plan view of the disc handling apparatus of the preferred embodiment.

Referring now to FIG. 3, a top plan view of the disc handling apparatus of the preferred embodiment is disclosed. Disc handling assemblies 100, 130 and 150 are mounted on a disc positioning table having a planar upper surface 220. A machining tool (not shown) is mounted beneath the planar surface 205, and has a center axis 200. The purpose of the machining tool is to machine a circular inner opening in the disc workpiece within the required dimensional tolerances as described generally above. Assemblies 100, 130 and 150 are located on radial lines 205, 210, 215 emanating from center axis 200 and disposed substantially equidistant from one another at 120° angles, as indicated in FIG. 2. As indicated, the workpiece disc 190 is disposed on the disc centering table between the disc handling assemblies.

Each assembly 100, 130 and 150 comprises a stepper motor, a slide apparatus having a slide member coupled to the stepper motor via a precision lead-screw, a disc pusher element attached to the slide member and adapted for contacting the periphery of the disc workpiece, and a proximity sensor fixedly attached with respect to the planar surface 205 for detecting a sensor target disposed on the slide member.

Referring now to assembly 100, stepper motor 105 comprises a stepper motor marketed by the Superior Electric Company, Bristol, Conn., as Model M091. Such motors are well known by those skilled in the art, and other similar units may well be substituted. This particular motor is adapted to provide incremental shaft rotation of 400 steps per shaft revolution. A slide arrangement 110, comprising a microslide assembly, is mounted to the table surface 220. Slide assembly 110 includes a slide member which is adapted for lateral translation along radial line 205 as indicated by bidirectional arrow 112. The slide member is coupled to the shaft of the stepper motor 105 by a precision lead-screw 115 attached to a shaft coupler (not shown). In the preferred embodiment, lead-screw 115 has 40 threads per inch. Hence, the slide will translate $6.25 \times 10^{-5}$ inches per motor step along radial line 205. The slide assembly 110 comprises, in the preferred embodiment, a unit marketed by the Micro-slide Company of Westbury, N.Y., as Model No. A2031L.

Attached to the slide member of slide assembly 110 is a disc pusher element 120 which protrudes from the slide assembly toward the center axis 200. Pusher member 120 is adapted to contact the periphery of the disc workpiece as the slide member is advanced along radial line 205.

The stepper motor 105 is driven by a motor driver (not shown), as is well known in the art. The driver in turn is controlled by a central computer, as will be discussed in more detail below. It will be readily apparent to those skilled in the art that by controlling the operation of the stepper motor, the pusher member 120 may be advanced or retracted along line 205 by precise steps of $6.25 \times 10^{-5}$ inches.

Assembly 100 further comprises a proximity sensor 125 and a sensor target 127 mounted to the slide member of slide assembly 110. In the preferred embodiment sensor 125 comprises a unit marketed by the Red Lion Company as Model No. PSAC0000. The sensor is adapted to generate an approximately 1 Mhz signal which is reflected by the target back to the sensor, and sets up eddy currents on the sensor face. These currents induce a voltage in a transducer transformer coil. As the target is moved closed to the sensor, the coil voltage increases until it reaches a threshold level triggering the sensor. Thus, the sensor is operable to detect the presence of the target at a predetermined, repeatable distance from the sensor. As will be described below, the pusher element position at which the sensor triggers is referred to as the "home" position.

Assemblies 130 and 150 are operable in a similar manner as that described for assembly 100. The respective slide members of slide assemblies 140 and 165 may be progressively advanced or retracted along radial lines 210 and 215, respectively. Both assemblies 130 and 150 include proximity sensors 148 and 160. The proximity sensors sense the presence of a target disposed on the slide 140,165 respectively.

Assembly 150 further comprises a displacement measuring device comprising of a linear variable differential transformer (LVDT) 175 having a spring loaded, movable core 180. As shown in FIG. 3, core 180 is aligned with radial line 215. Core 180 extends through an opening in the two protruding members which comprise pusher member 170. In the preferred embodiment, the LVDT comprises a model GCA LVDT marketed by the Schaevitz Company, Pennsauken, N.J.

The LVDT is an electromechanical transducer device that produces an electrical (voltage) output proportional to the displacement of the separate movable core. The transducer output is zero when the core is at its center or null position. When the core is moved from the null position to positions within the nominal linear range, the voltage output changes linearly with the changes in core position. The phase of the output voltage changes by 180° as the core is moved from one side of the null position to the other.

Figure 4:
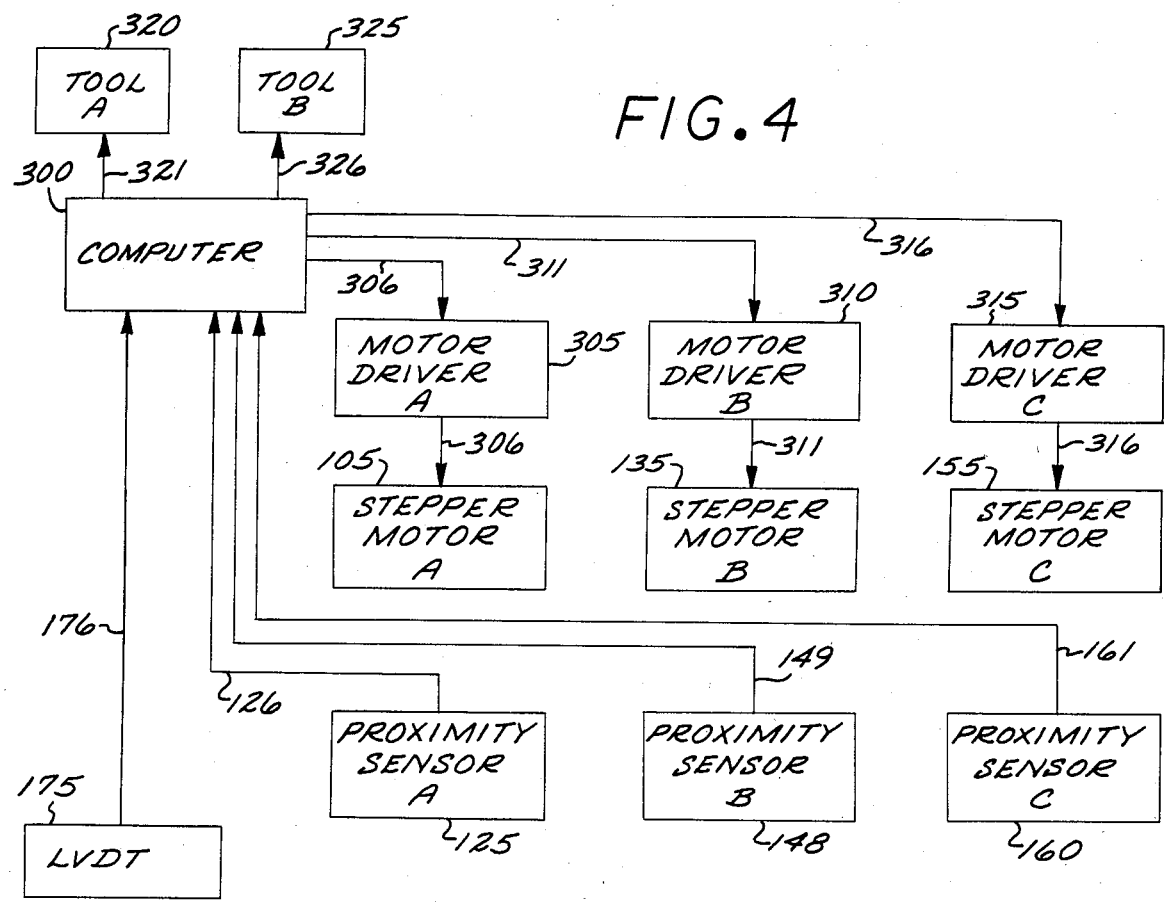
FIG. 4 is a block diagram illustrating the electrical control system of the preferred embodiment.
Figure 5:
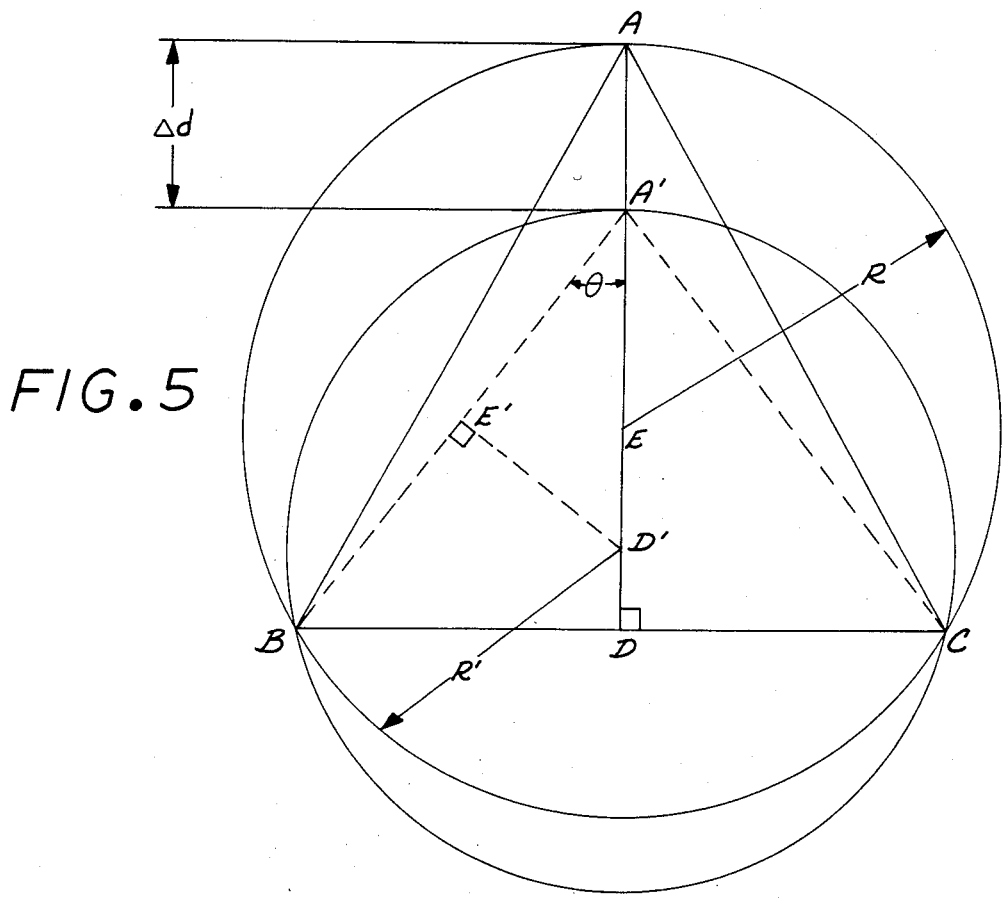
FIG. 5 is a diagram illustrating the geometric relationship between the master workpiece disc tool and a disc whose radius is to be calculated.

Referring now to FIG. 4, a schematic block diagram of the electrical elements comprising the preferred embodiment is illustrated. System computer 300 controls the system. The computer 300 is coupled to motor drivers 305, 310 and 315 by lines 306, 311 and 316, respectively. The motor drivers respectively drive the three stepper motors 105, 135 and 155. The three proximity sensors 125, 148, 160 are respectively coupled to computer 300 via lines 126, 149 and 161. The LVDT 175 is connected to the computer 300 via line 176. The computer also controls the machine tools which are to perform operations on the disc workpiece. Thus, for example, tool A may comprise a gripping tool to clamp the workpiece in the center position, while tool B may, for example, by a milling or drilling tool adapted to remove an annular region from the workpiece. These types of work tools are merely illustrative, as the invention has utility in many other applications.

The preferred embodiment of the disc position centering apparatus, apart from the system computer, has three basic elements as illustrated in FIG. 3, the disc movers (stepper motors, micro-slides, and disc pushers), the reference elements (proximity sensors and targets), and the displacement measuring device.

The act of moving a disc to the centered position (for subsequent clamping and machining) is accomplished through control signals from the system computer 300 to the stepper motor drivers 305, 310, 315. The drivers in turn operate the stepper motors, whose rotary motion is converted to translation by the lead-screw driven slide members on which the disc locating pushers are mounted.

The three proximity sensors and their targets are set up to provide calibrated "home" positions for the three disc pushers.

The "home" positions of the disc pusher elements are first established during a calibration cycle setting the slide members on which the respective pusher elements are mounted at the point at which the proximity sensors are triggered. A master disc tool is disposed on the centering table during the calibration cycle, having a precise circular edge, centered with respect to the machining operation, and of known diameter. The diameter of the master disc tool is intentionally larger than the workpiece discs to be centered during the operation cycle. For the instance in which the nominal diameter of the workpiece disc is 5.118 inches, with an allowable tolerance of ±0.003 inches, the diameter of the master disc is selected at 5.131 inches. The larger size of the master disc tool is required to ensure clearance for the workpiece discs to be centered and to provide a measure of closure distance for the three disc pushers 120,147, 170 in the disc centering process.

The master disc tool is placed on the centering table between the three disc pushers 120,147,170 (FIG. 3). The master disc tool is centered on axis 200. This centering process is accomplished in the preferred embodiment by mounting an arbor in the machine tool B mounted below the centering table, with a centering pin extending upwardly through opening 185 in the table surface 220. The diameter of the pin is chosen to provide a close sliding fit with the inner opening centrally disposed in the master disc tool. Thus, when the master disc tool is slipped onto the centering pin, the pin acts as a registration member to center the master disc tool.

The three disc pushers 120,147,170 are brought into contact with the peripheral edge of the master disc tool by inputting instructions to the system computer 300, causing the stepper motors to operate. Alternatively, the pusher elements may be advanced to within a predetermined distance from the periphery, determined by use of a feeler gauge. While the three disc pushers are at this reference position with respect to the outer edge of the master disc tool, instructions are inputted to the system computer that sets the relationship between the "home" positions of the three disc pusher elements and the points of contact between the three disc pushers and the edge of the master disc tool. Specifically, the computer stores information indicative of the number of motor steps required to advance each pusher element to the edge of the master disc tool from the "home" position. The computer also stores the voltage value from the LVDT indicative of the core's position when the pusher element 170 is at the reference position adjacent the periphery of the master disc tool. The master disc tool and centering arbor are then removed.

The LVDT 175 may also be calibrated during the calibration mode. The LVDT utilized in the preferred embodiment includes a mechanical adjustment adapted to locate the core 185 of the LVDT to a centered position so that the LVDT will be operating in a linear range throughout the expected range of core movement. Once this step has been accomplished, a further calibration may be carried out to calculate the slope of the voltage signal generated by the LVDT. This comprises two reference measurements performed on two LVDT calibration discs having known outer diameters. In the preferred embodiment, the discs have respective outer diameters of precisely 5.115 and 5.121 inches, i.e., the lower and upper tolerance limits for acceptable discs as described above. These chosen dimensions need not be the same as the tolerance dimensions, as other sizes could also be used to calculate the slope of the voltage response of the LVDT.

The LVDT slope calibration comprises placing one calibration disc on the calibration table between the disc pushers. Disc pusher elements 120,147,170 are moved to their reference positions as determined using the master disc tool. Since the two LVDT calibration discs have known diameters smaller than the master disc, spring-loaded core 185 extending toward center axis 200 will contact the disc and move it against the two opposite pusher elements 120,147. Pusher element 170 will not contact the calibration disc. As described below, the position of the core 185 is used to define a displacement value $\Delta d$ used to calculate the radius of the workpiece disc. The voltage value of the LVDT with the smaller calibration disc is read by the computer. The same operation is then repeated with the larger diameter calibration disc. Since the radii of the LVDT calibration disc are known, a slope value for the linear function representing LVDT voltage versus core displacement can be calculated, as discussed more fully below.

During the operation cycle, a workpiece disc which is to be centered, gripped and subsequently machined, is placed on the disc centering table. In the course of the operating cycle, the disc pushers are automatically moved by instructions from the computer 300 to the motor drivers 305,310,315 from the "home" positions to the reference points concentric with the center of the master disc tool as it was previously positioned on the centering table. During this movement of the three disc pushers, the spring loaded core 180 of LVDT 175 contacts the workpiece disc (to be measured) and urges it up against the two opposite pushers 120,147 which are in the calibrated locations determined during the calibration cycle.

FIG. 4 represents a plan view illustrating the geometrical relationship between the points of contact of the two disc pushers 120,147 and the core 180 of LVDT 175 and the outer edges of the master disc tool and the workpiece disc to the measured and centered.

Positions A, B and C represent the points of contact of the LVDT 175 and disc pusher members 120,147,170, with the outer edge of the master disc tool of Radius R.

Positions A', B and C represent the points of contact of the core 180 of LVDT 175 and disc pusher members 120,147 with the edge of a workpiece disc of radius R' (smaller than the radius R of the master disc tool) to be determined by the system computer 300.

The LVDT 175 associated with the disc pusher in position A, generates a voltage signal indicative of the distance $\Delta d$ between points A and A'.

Radius R of the master disc tool is determined by the two-thirds angle bisector rule for an equilateral triangle to be two-thirds the distance AD, placing the center of the master disc tool at position E.

$$R = \tfrac{2}{3} AD \quad \text{(Eq. 1)}$$

Radius R' (of the workpiece disc whose radius is to be calculated) is determined from the geometry rule that the perpendicular bisector of the chord of a circle passes through the center of the circle, and the fact that lines E'D' and A'B are such lines.

$$R' = A'D' \quad \text{(Eq. 2)}$$

and $$\cos \theta = \frac{A'E'}{A'D'} = \frac{A'D'}{A'B} \quad \text{(Eq. 3)}$$

From Equations 2 and 3, the following relationship for R' may be derived:

$$R' = \frac{(A'E')(A'B)}{A'D} = \frac{((\tfrac{1}{2})A'B)(A'B)}{A'D} = \frac{(\tfrac{1}{2})(A'B)^2}{A'D} \quad \text{(Eq. 4)}$$

Furthermore:

$$(A'B)^2 = (BD)^2 + (A'D)^2 \quad \text{(Eq. 5.1)}$$

$$= ((\sqrt{3}/2)R)^2 + ((3/2)R - \Delta d)^2 \quad \text{(Eq. 5.2)}$$

Therefore, $$R' = \frac{(1/2)[((\sqrt{3}/2)R)^2 + ((3/2)R - \Delta d)]^2}{(3/2)R - d} \quad \text{(Eq. 6.1)}$$

$$= \frac{3R^2 - 3R\Delta d + \Delta d^2}{3r - 2\Delta d} \quad \text{(Eq. 6.2)}$$

The distance (R-R') each of the three disc pushers must be moved to center and to grip the workpiece disc of radius R' are determined in the following calculation:

$$R - R' = R - \frac{3R^2 - R\Delta d + \Delta d^2}{3R - 2\Delta d} \quad \text{(Eq. 7.1)}$$

$$= \frac{R\Delta d - \Delta d^2}{3R - 2\Delta d} = \frac{\Delta d (R - \Delta d)}{3R - 2\Delta d} \quad \text{(Eq. 7.2)}$$

The number of steps $N_s$ each of the three stepper motors (which move the disc pushers toward the disc to be measured) must take from the master disc reference position to accomplish disc centering and gripping of this disc, is derived as follows:

$$N_s = \frac{\text{disc pusher travel } (R - R')}{\text{disc pusher travel per step}} \quad \text{(Eq. 8)}$$

$$= \frac{R - R'}{6.25 \times 10^{-5}} = \frac{\Delta d (R - \Delta d)}{6.25 \times 10^{-5} (3R - 2\Delta d)}, \quad \text{(Eq. 9)}$$

Since the stepper motor used in the preferred embodiment has 400 steps per shaft revolution, and the leadscrews have a pitch of 40 revolutions per inch, the disc pusher travel per motor step is $6.25 \times 10^{-5}$ inches per step.

Since the size R of the master disc tool is known, the only unknown in Equations 7.2 and 9 is $\Delta d$. Distance $\Delta d$ is determined utilizing displacement signals from the LVDT. Since the LVDT has been set up to operate in a linear range, i.e., its core position is proportional to LVDT voltage multiplied by a slope constant, the two calibration disc LVDT voltage measurements are used to calculate the slope of the LVDT voltage function.

$$D_c = SV \quad \text{(Eq. 10)}$$

where $D_C$ is the core displacement, S is the voltage slope constant, and the LVDT voltage value.

The slope S is calculated from the LVDT voltage values using the two calibration discs during the calibration mode.

$$S = \frac{D_1 - D_2}{V_1 - V_2} \; \frac{\text{inches}}{\text{volt}} \quad \text{(Eq. 11)}$$

where $D_1, D_2$ represent the displacement values $\Delta d$ for the larger and smaller calibration discs, respectively, and $V_1, V_2$ represent the LVDT calibration discs, respectively. Since the outer radii of the two calibration discs are known, Equation 6.2 can be used to calculate the values $D_1, D_2$ for the calibration discs.

The value for the core displacement from its calibration position for the master tool is defined then by the relationship of Equation 12.

$$\Delta d = (V_W - V_R)S, \quad \text{(Eq. 12)}$$

where $V_W$ is the LVDT voltage value for the workpiece disc and $V_R$ is the reference LVDT voltage measured for the master disc.

Once the calibration mode has been completed, and the LVDT has measured $\Delta d$ for the workpiece disc, the system computer has the necessary information to move the three pusher elements from their reference positions in a concentric manner for the workpiece disc to be centered and held in place for the clamping and subsequent machining of the disc. With the radius R' calculated, each pusher element can be moved in toward center 200 by the distance R-R'. This may be accomplished by stepping each stepper motor 305,310,315 by the number of steps calculated in accordance with Equation 9.

The system computer 300 is programmed to carry out the functions described hereinabove with respect to the calibration and operation modes. As will be apparent to those skilled in the art, there will be innumerable computer programs which may devised by computer programmers to carry out these functions. However, to illustrate the function of the system in more detail, flow charts of the calibration mode and the operation mode carried out by the computer are set forth in FIG. 6 and FIGS. 7A and 7B.

Figure 6:
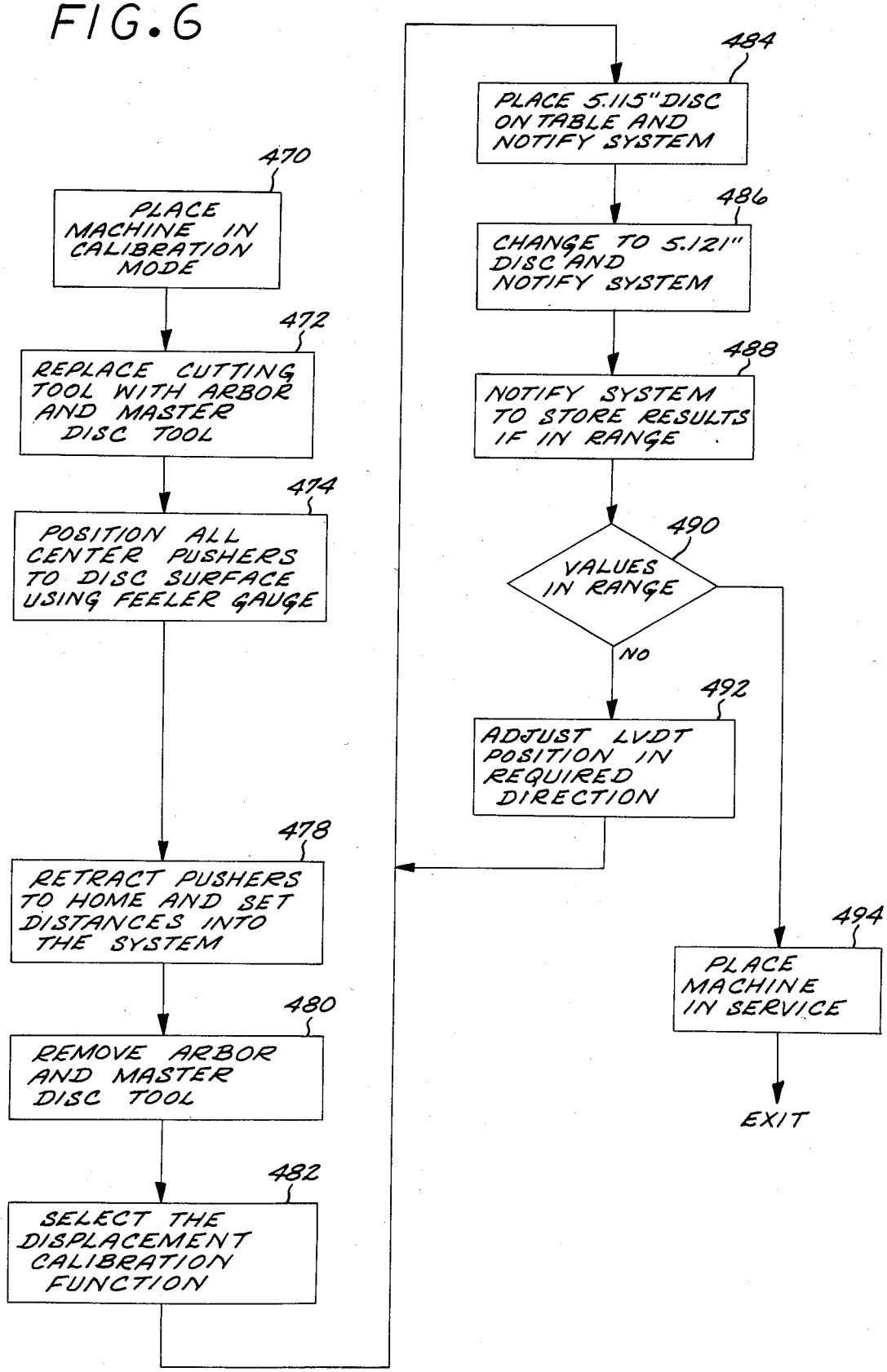
FIG. 6 is a flow chart illustrating the operation of the preferred embodiment in the calibration mode.

Referring now to FIG. 6, at step 470 the system operator places the machine in the calibration mode. At step 472 the cutting tool of machine tool 325 is replaced with the arbor, and the master disc tool is placed on the registration pin extending upwardly from the arbor. At step 474 the disc pusher elements are positioned adjacent the periphery of the master disc tool using feeler gauges to precisely position the elements.

At step 478 the pusher elements are retracted to their home positions, and the distances (or number of motor steps) between the respective home positions and the master disc periphery are stored in the system computer. The arbor and master disc tool may then be removed at step 480.

At step 482 the operator may select the displacement calibration function. The operator then places the undersized (5.115 inches diameter) calibration disc on the table at step 484. During this step the pusher elements are positioned to their disc reference positions and the LVDT voltage value is sensed by the system computer. When this is accomplished and the pushers retracted to the home positions, then at step 486 this operation is repeated for the oversized (5.121 inch diameter) calibration disc. At step 488 if the LVDT voltage values are within the desired linear range, these values are stored for use in calculating the LVDT voltage source curve in the operational mode. At decision point 490 the system elects to have the LVDT position adjusted in the required direction at step 492 if the voltage values were not in the desired range, and the system operation reverts to step 484 to repeat the calibration function. If the LVDT voltage values are within the desired range, then at step 494 the machine is ready to be placed in the operation mode.

Figure 7A:
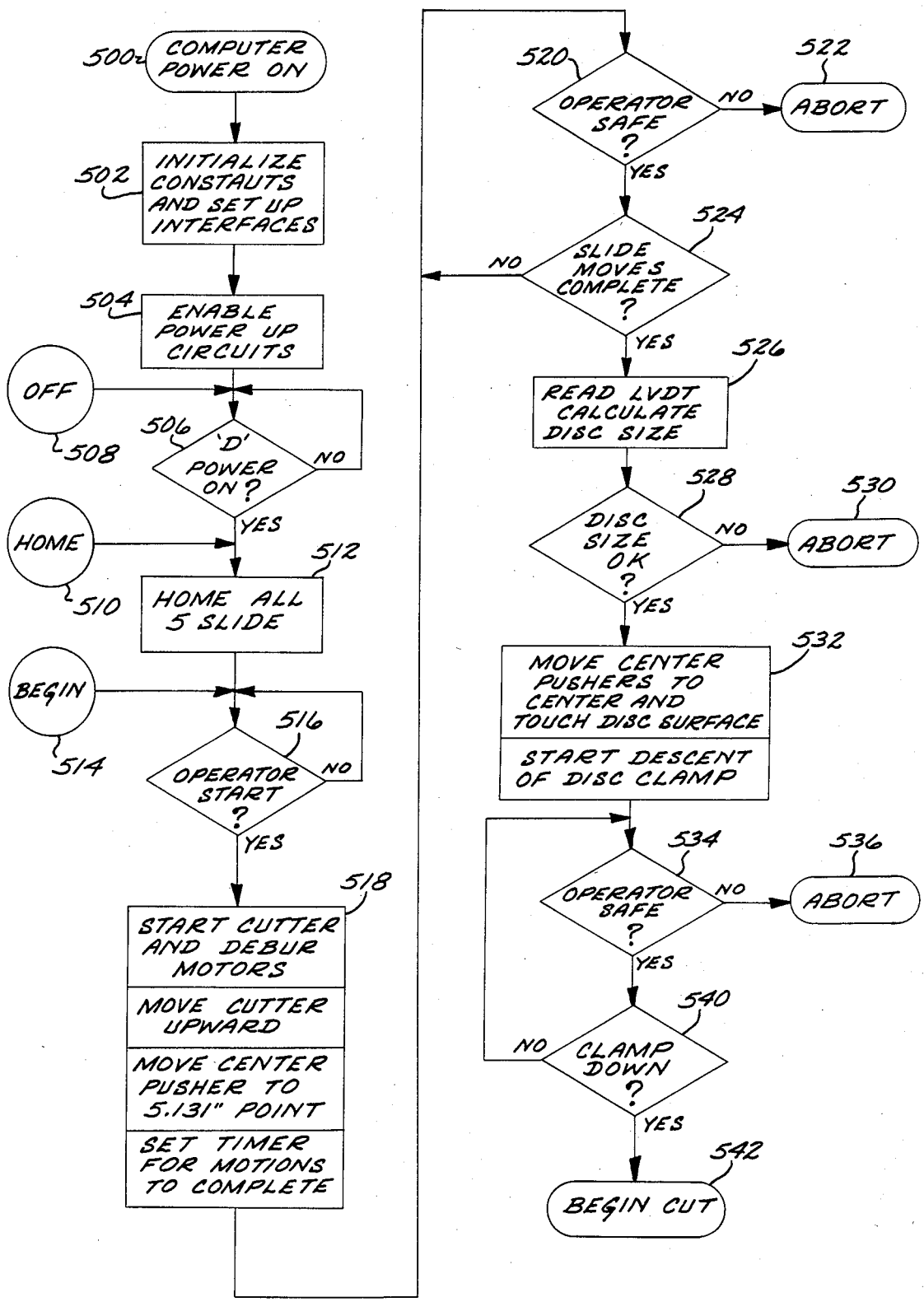
FIGS. 7A and 7B are flowcharts illustrating the operation of the preferred embodiment in the operation mode.

Referring now to FIG. 7A, a flow chart is illustrated to demonstrate the operation of the system during the system operation mode. At this point, the calibration mode is assumed to have been completed so that the data calculated during the calibration mode has been stored by the computer.

At step 500 computer power is turned on and at step 502 constants are initialized and the various system interfaces are established. At step 504 the power up circuits are enabled. At step 506 the system senses whether or not the machine power is turned on, i.e., the machinery disposed on the disc positioning table such as the drivers, machine tools and so forth. If not, the system waits at step 506 until it senses the power is turned on. At step 512 the system instructs all five slides to their "home" positions. The five slides comprise the slides of the positioning means, as well the slides on which machine tools A and B are mounted. At step 516 the system checks an operator start switch to determine whether the operator has indicated that operation is to commence. If the operator has given that indication, then at step 518 the machine tool motors are started for the cutter and deburring machines (tool B), the cutter is moved upwardly, the disc pusher elements are moved to the reference positions determined for the master disc tool (which had a diameter of 5.131 inches), and a timer is set to determine when these motions are completed.

Figure 7B:
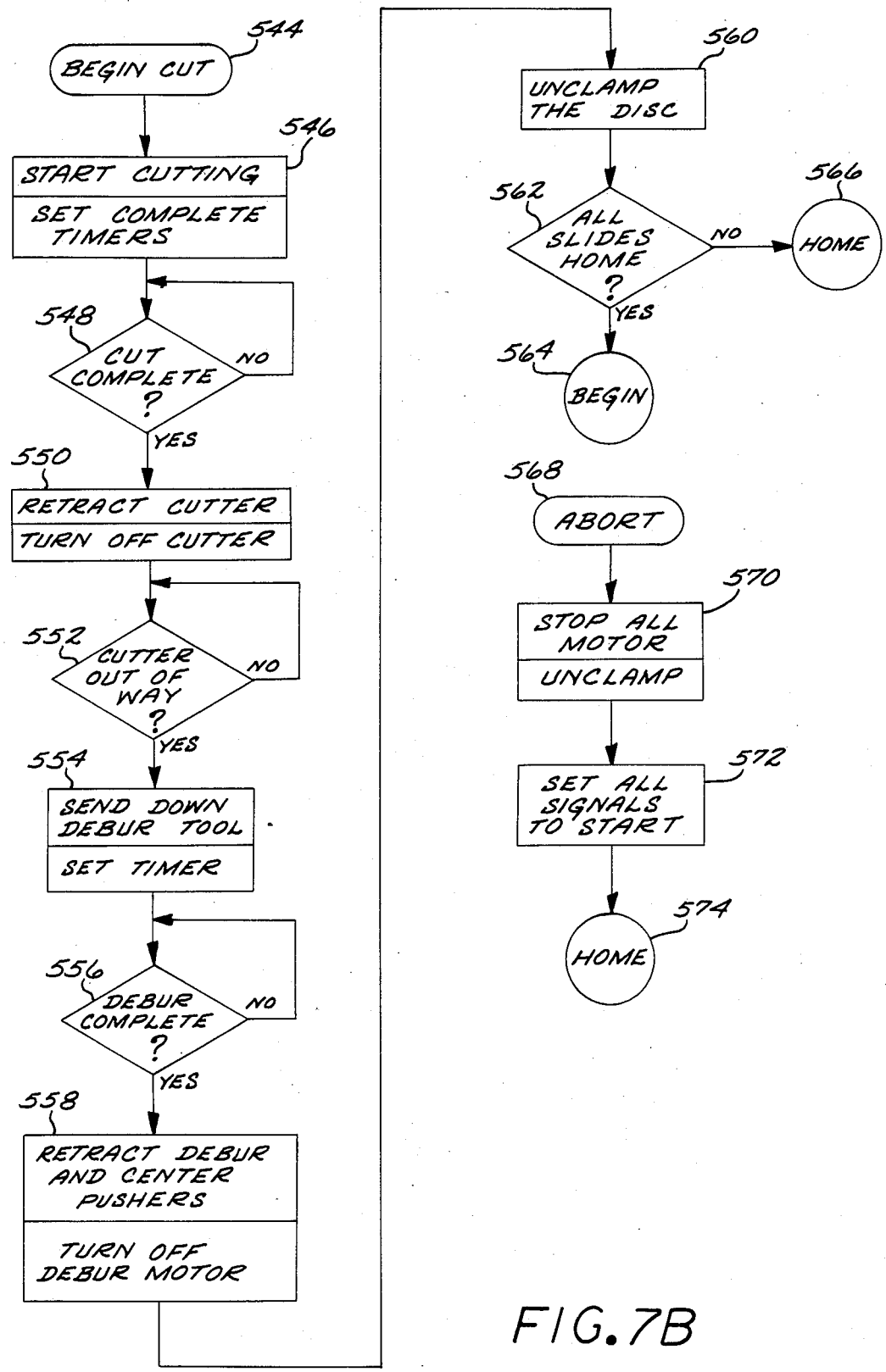

At step 520 the system performs an "operator safe" test which may, for example, require that the operator depress simultaneously two switches to ensure that the operator is ready to proceed and has his arms and hands out of the machine tools' paths. If the test result is negative, the system operation proceeds to the "ABORT" routine (FIG. 7B). If the result is positive, then at step 524 the system checks the timer to determine whether the slide moves are completed and if not, the system operation loop back to step 520. If at step 524 the slide motion is complete, then the computer system at step 526 reads the LVDT voltage level and calculates the workpiece disc diameter. At step 528 the system determines whether the calculated disc size is within the tolerance level allowable for the finished part. If not, the operation proceeds to the "ABORT" routine. At step 532 if the disc size is acceptable, then the pusher elements are moved to the calculated positions to center and touch the disc surface, and the disc clamp (machine tool A) descent is commenced.

At step 534 another "operator safe" decision is made and if a negative response is indicated, then the system operation reverts to the "ABORT" routine. If the operation is safe at step 534, then at step 540 a test is made to determine whether the disc clamp is in its down position. If not, the operation reverts to step 534. If the clamp is down, then at step 542 the cutting operation to machine an inner opening in the workpiece commences.

Referring now to FIG. 7B, at step 546 the cutter timers are commenced. At step 548 a decision is made to determine whether the cut is complete, i.e, whether the timer has timed out. The operation loops through this decision point until a positive indication that the cut is complete is achieved. Then at step 550 the cutter is retracted and the cutter motor is turned off. Step 552 is a decision point to determine that the cutter is now out of the way so that the deburring tool (part of machine tool A) may be sent down from the upper side of the centering table. At step 554 the deburring tool is started on its downward motion and the timer is set to time out the deburring operation. At step 556 the system determines whether the timeout of the deburring operation has been accomplished, and if it has, then at step 558 the deburring tool and the disc pusher are retracted. The deburring motor is then turned off.

At step 560 the disc clamp (machine tool A) is lifted, and at step 562 the system senses the slides to determine whether they are in their home positions. If not, then the operation reverts to step 510 (FIG. 7A). If all slides are in the home position, then a step 564 the system operation loops back to step 514 (FIG. 7A) to commence operation on a new disc.

FIG. 7B also includes the "ABORT" routine program. At step 570 once the abort routine has been entered all motors are stopped and the disc clamp is lifted. At step 572 all input signals are set to the start point, and at step 574 the computer is instructed to re-enter the operation mode at step 512.

There has been described herein a preferred embodiment of the present invention. Other computer programs, variations to the apparatus and the like will be apparent to those skilled in the art. Accordingly, the scope of the present invention is limited only by the scope of the appended claims.

What is claimed is:

1. Apparatus for centering an object having a substantially circular periphery, comprising:
   first object positioning means for contacting the periphery of the object and adapted to operate in response to first positioning signals;
   second positioning means for contacting the periphery of the object and adapted to operate in response to second positioning signals, said second positioning means including a displacement measuring means adapted to generate a displacement signal indicative of its position relative to a reference location;

controller means, coupled to said first and second positioning means and adapted to provide said first and second positioning signals thereto, for controlling the positioning means to contact the object, determining the radius of the object as a function of the displacement signal and subsequently controlling the first and second positioning means so as to position the center of the object substantially at a predetermined axis.

2. The apparatus of claim 1 wherein said apparatus includes a substantially planar surface and said first and second positioning means comprise first and second pusher elements disposed adjacent said planar surface about said predetermined axis.

3. The apparatus of claim 2 wherein said first and second pusher elements are adapted for translation toward said predetermined axis.

4. The apparatus of claim 3 wherein said displacement signal is representative of the distance $\Delta d$ between a reference point and the periphery of the object when the object is disposed in a measurement location.

5. The apparatus of claim 4 wherein said reference point is a predetermined distance from said axis, said distance larger than the radius of the object.

6. The apparatus of claim 5 wherein said first positioning means comprises first and second pusher elements disposed equidistant from said second positioning means about said axis, and each adapted to be positioned at reference points disposed said predetermined distance from said axis.

7. The apparatus of claim 6 wherein said displacement measuring means includes means adapted to urge said object into contact with said first and second pusher elements to dispose the object in said measurement position.

8. The apparatus of claim 7 wherein said controller means is adapted to determine the radius of said object in accordance with the following relationship:

$$\text{radius} = \frac{3R^2 - 3R\Delta d + \Delta d^2}{3R - 2\Delta d}.$$

9. The apparatus of claim 1 further comprising clamping means for clamping said object in its centered position.

10. The apparatus of claim 9 wherein said clamping means is mounted on a slide member for movement along said axis.

11. The apparatus of claim 11 wherein said clamping means is controlled by said controller means.

12. Apparatus for disc position centering at an axis comprising: 'first, second and third positioning means, disposed substantially equidistant from one another about said axis, for contacting the periphery of a disc, said positioning means being movable toward and away from said axis;

measuring means, cooperating with said positioning means, for determining the radius of a disc while the positioning means are at predetermined locations; and control means for moving each of the positioning means a predetermined distance from the axis in response to the determined radius to contact the periphery of the disc and center the disc with respect to the axis.

13. The apparatus of claim 12 wherein said control means comprises stepper motor means arranged to drive lead-screw means.

14. The apparatus of claim 13 further comprising first, second and third sensor means coupled respectively to said first, second and third positioning means, each of said sensor means adapted to generate a sensor signal when the respective positioning means is disposed at a home position.

15. The apparatus of claim 14 wherein said control means is adapted to move said first, second and third positioning means from said home positions to reference positions a predetermined distance from said axis by causing each stepper motor to rotate through predetermined numbers of motor steps.

16. A method for positioning the center of a disc in relation to an axis, comprising the step of:
(i) providing first, second and third disc positioning elements disposed about said axis substantially equidistant from each other;
(ii) determining reference positions for each of said positioning means, each of said reference positions being disposed a predetermined reference distance from said axis;
(iii) moving said first, second and third positioning means to said reference positions;
(iv) urging a disc disposed between said positioning means into contact with said second and third positioning means;
(v) determining a displacement value indicative of the distance between said first positioning means and the periphery of the disc;
(vi) calculating the radius of the disc in dependence upon said displacement value; and
(vii) moving the positioning means toward the axis a distance equal to the difference between said predetermined distance and said calculated radius so as to contact said disc and position its center at said axis.

17. The method of claim 16 wherein step of determining reference positions comprises the steps of:
(i) centering at said axis a master disc having a predetermined radius larger than the radius of a workpiece disc to be centered at said axis;
(ii) placing said first, second and third positioning means in contact with the periphery of said disc; and
(iii) storing values indicative of each of said reference positions.

18. The method of claim 16 wherein said predetermined distance is larger than the radius of a workpiece disc to be centered.

* * * * *